United States Patent [19]
Goldstein

[11] Patent Number: 6,060,026
[45] Date of Patent: May 9, 2000

[54] PHOTOELECTROCHEMICAL DEVICE CONTAINING A QUANTUM CONFINED SILICON PARTICLE

[75] Inventor: Avery N. Goldstein, Huntington Woods, Mich.

[73] Assignee: Starfire Electronic Development & Mktg., Ltd., Bloomfield Hills, Mich.

[21] Appl. No.: 08/910,595

[22] Filed: Jul. 31, 1997

[51] Int. Cl.[7] .................................................. B01J 19/08
[52] U.S. Cl. .............................................................. 422/186
[58] Field of Search .............................. 422/186, 186.3; 204/157.5, 157.52, 157.15

[56] References Cited

U.S. PATENT DOCUMENTS

| | | | |
|---|---|---|---|
| 4,466,869 | 8/1984 | Ayers | 204/157.1 R |
| 4,650,554 | 3/1987 | Gordon | 204/129 |
| 4,889,604 | 12/1989 | Khan et al. | 204/157.5 |
| 4,966,759 | 10/1990 | Robertson et al. | 422/186 |
| 5,262,023 | 11/1993 | Sayama | 204/157.5 |
| 5,767,018 | 6/1998 | Bell | 438/696 |
| 5,790,934 | 8/1998 | Say et al. | 422/186 |
| 5,850,064 | 12/1998 | Goldstein | 204/157.4 |

OTHER PUBLICATIONS

Yoneyama et al., Photocatalytic Decomposition of Formic Acid on Platinized n–Type Silicon Powder in Aqueous Solution, Bull. Chem. Soc. Jpn., 59, 3302–3304 (1986).

Kuehne et al., The Electronic Band Character of Ru Dichalcogenides and its Significance for the Photoelectrolysis of Water, Chem. Phys. Lett., 112(2), 160–162 (1984).

Rufus et al., Cadmium Sulfide with Iridium Sulfide and Platinum Sulfide Deposits as a Photocatalyst for the Decomposition of Aqueous Sulfide, J. of Photochemistry and Photobiology A: Chemistry 91, 63–65 (1995).

Igumenova, T.I.; Parmon, V.N.; Photostimulated Vectorial Electron Transfer across the Bilayer Membrane of Lipid Vesicles in a System with CdS Nanoparticles as Photosensitizer and 1,4–bis (1,2,6–triphenyl–4–prydiyl) benzene as a Reversible Two–electron Carrier, J. of Photochemistry and Photobiology A: Chemistry 90, 159–166 (1995).

Rajeshwar, K.I., Photoelectrochemistry and the Environment, J. of Appl. Electrochemistry 25, 1067–1082 (1995).

Matsumura et al., Photocatalytic and Photoelectrochemical Reactions of Aqueous Solutions of Formic Acid, and Methanol on Platinized CdS Powder and at a CdS Electrode, J. Phys. Chem., 88, 248–250 (1988).

Harbour et al., Effect of Platinization o the Photoproperties of CdS Pigments in Dispersion, J. Phys. Chem., 85, 4026–4029 (1981).

Matthews, R.W., An Adsorption Water Purifier with in Situ Photocatalytic Regeneration, J. of Catalysis, 113, 549–555 (1988).

Henglein, A., Photochemistry of Colloidal Cadmium Sulfide. 2. Effects of Adsorbed Methyl Viologen . . . , J. Phys. Chem., 86, 2291–2293 (1982).

Matsumoto et al., Photoinduced Reactions of Viologens on Size–Separated CdS Nanocrystals, J. Phys. Chem., 98, 11549–11556 (1994).

Malinka et al., Hydrogen production from water by visible light using zinc porphyrin–sensitized platinized titanium dioxide, J. of Photochemistry and Photobiology A: Chemistry 90, 153–158 (1995).

Lu, G. and Li, S., Effects on surface etching on the structure and performance of Rh2O3/Cds catalyst, J. of Photochemistry and Photobiology A: Chemistry 97, 65–72 (1996).

*Primary Examiner*—Kathryn L. Gorgos
*Assistant Examiner*—Wesley A. Nicolas

[57] ABSTRACT

A method for reacting a molecule using light as an energy source is described which comprises exposing the molecule to a catalyst material, the catalyst material in contact with an illuminated, quantum confined silicon domain. The silicon domain having a band gap greater than bulk silicon and sufficiently large for reacting the molecule. The method is particularly useful in decomposing water into hydrogen and oxygen, as well as photocatalytically degrading pollutants in a waste stream.

11 Claims, 3 Drawing Sheets

PHOTOELECTROCHEMICAL DEVICE CONTAINING A QUANTUM CONFINED SILICON PARTICLE

FIELD OF THE INVENTION

The present invention relates generally to the photocatalytic decomposition of molecules. In particular, the present invention relates to the decomposition reaction of water into hydrogen and oxygen, and the electrochemical reduction and/or oxidation reaction of a compound. The particular reaction involving a silicon nanoparticle exhibiting quantum size effects, as a light harvesting semiconductor in direct contact with a suitable catalyst.

BACKGROUND OF THE INVENTION

The requirement of supplying electrical energy to drive electrochemical reactions often makes such reactions cost prohibitive. For this reason, use of solar energy to power electrochemical reactions has long been contemplated. The electrochemical reactions most often so considered include the decomposition of water into the gases hydrogen and oxygen, and the degradation of organic contaminants from an effluent stream.

The conversion of sunlight and water into a clean, high efficiency chemical fuel has been a goal for a number of years and the urgency increases as damaging effects of burning fossil fuels becomes ever more apparent. Photolysis of water to yield hydrogen and oxygen has been widely demonstrated under visible light illumination of Group II-sulfides and selenides (i.e. CdS, CdSe, ZnS, etc.), and under ultraviolet light illumination of $TiO_2$, $BaTiO_3$, ZnO, etc. These semiconductors are typically loaded with metal and or metal oxide catalysts to promote the transfer of electrons and holes, respectively to the reactant-device interface.

The use of solar energy to decompose contaminants such as organics, inorganic salts and microbes allows for remediation to effectively cope with seepage of pollutants into an environment. The photocatalyzed decomposition of organic contaminants is well known to the art(K. Rajeshwar, J. of Applied Electrochemistry 25, 1067(1995)). A variety of halocarbons react under exposure to ultraviolet light in the presence of $TiO_2$ to give less noxious byproducts (C-Y. Hsiao, J. of Catalysis 82, 412 (1983)). Other transition metal oxides and Group II-VI semiconductors have also been utilized to degrade environmental contaminants.

In general, current photocatalytic systems suffer from low reaction rates. Reaction-induced changes in pH, donor concentrations and surface trap sites are at least partly responsible for the low reaction rates observed. In the case of some of the Group II-VI semiconductors, the exposure to light and the presence of oxygen digests the semiconductor domain. For example, while CdS has favorable light absorption properties, under aqueous reaction conditions it is converted to the water soluble compound $CdSO_4$, thereby consuming the semiconductor in the course of reaction. Reaction rates suffer further from harvesting only those incident photons which are greater than the band gap absorption of the semiconductor. Thus, it is an object of the present invention to provide a semiconductor that has a tunable band gap such that harnessable light energy is collected efficiently in the course of photochemical reaction and with minimal changes in efficiency with operation.

Platinized n-type bulk silicon has proven to be an inefficient photocatalyst for hydrogen generation from organic molecules. The band gap of silicon was identified as being less than the theoretical decomposition voltage of the half-cell reactions (H. Yoneyama, N. Matsumoto and H. Tamura, Bull. Chem. Soc. Jpn. 59, 3302 (1986)). Thus, it is a further object of the present invention to provide a silicon semiconductor with a more favorable band gap for photocatalytic decomposition reactions than that of bulk silicon.

Another object of the present invention is to provide a device for the selective photoelectrolysis of water, inorganic salts and organic molecules that shows superior stability towards the corrosive solution environment as compared to binary and ternary semiconductor compounds.

Still another object of the present invention is to provide a method for producing hydrogen and oxygen photocatalytically from water.

The stability of silicon oxides, the tunable control of energy gap and charge carrier characteristics affords heretofore unobtainable photolysis rates over time for catalyzed, quantum confined silicon particles towards water and various aqueous pollutants.

Other and further objects, features and advantages of the present invention will become apparent in the following description.

SUMMARY OF THE INVENTION

A method is disclosed for a chemical reaction of a molecule using a quantum confined silicon domain to absorb photons of equal or greater energy than the band gap of the silicon domain. The photon absorption by the silicon domain is of sufficient energy to induce the chemical reaction. The absorbed photons are transferred to the molecule by way of at least one catalytic material bonded to the silicon domain.

A photoelectrochemical device is also disclosed having a quantum confined silicon domain, and at least one catalytic material attached thereto. The silicon domain has a band gap greater than bulk silicon and suitable for driving a desired reaction.

DETAILED DESCRIPTION OF THE INVENTION

Figure 1:
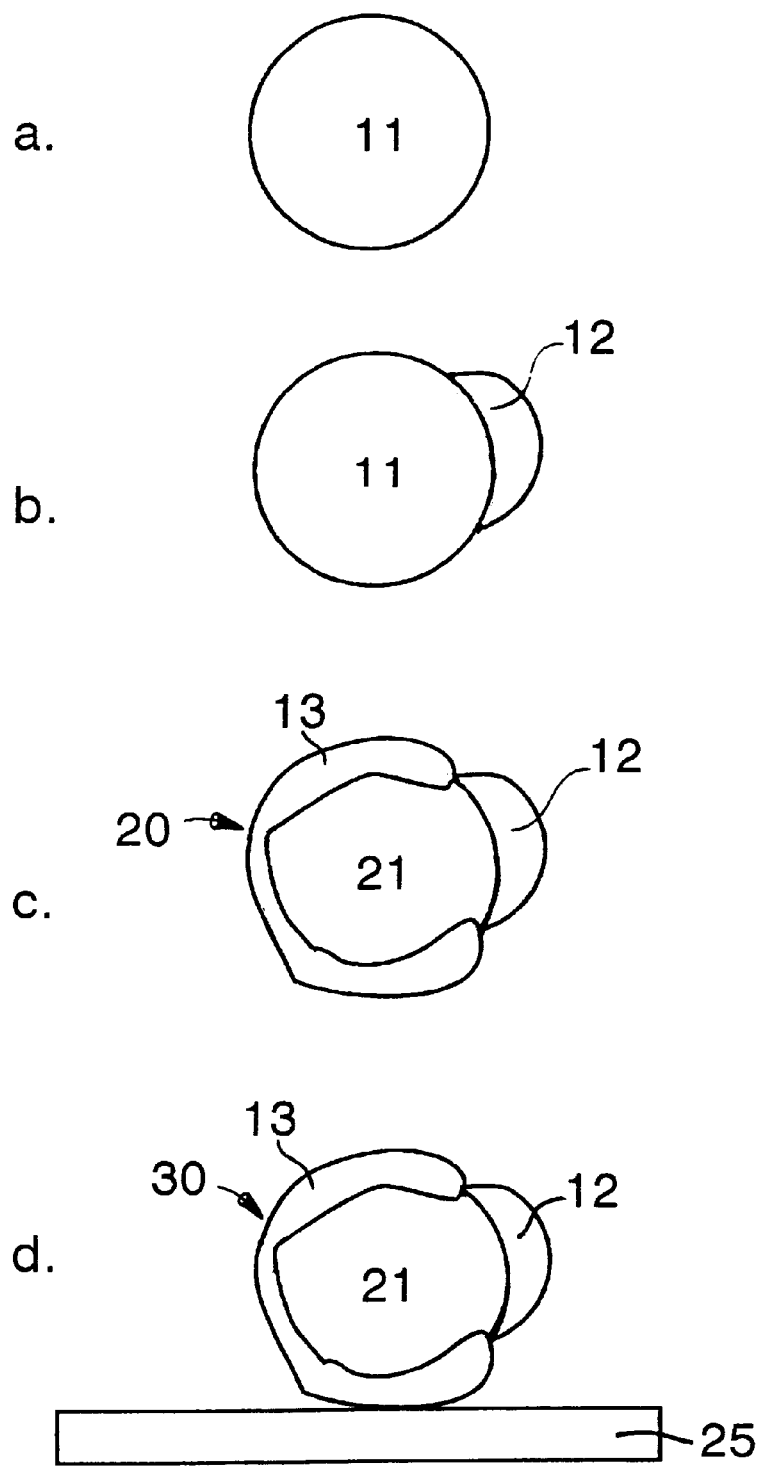
FIGS. 1(a)–(d) are a cross-sectional view of the sequence of steps in forming an embodiment of the present invention, wherein the semiconductor has a catalyst island thereon.

The construction of a photoelectrochemical device begins with the synthesis of a silicon particle 11, optionally containing a dopant (not shown), FIG. 1(a). The particle is additionally modified with at least one catalyst 12, FIG. 1(b). The surface of the particle 11 is oxidized, thereby forming a protective shell of silicon oxide 13 (SiO and or $SiO_2$)on the portions of the silicon particle surface not bonded to the catalyst 12, FIG. 1(c). The silicon oxide layer 13 renders the silicon particle impervious to the corrosive components created by the photolysis reaction, yet is generally transparent to actinic light. The photoactive device 20, composed of a reduced domain size silicon particle 21, the catalyst 12 and the silicon oxide surface layer 13 is then preferably adhered to a substrate 25, FIG. 1(d). The substrate 25 serves to immobilize the previously liquid-suspended silicon particle 11. It is appreciated that the sequence of forming the silicon oxide layer 13 and binding the photoactive device to a substrate 25 is interchangeable. The elements of the photoactive device 20 and the substrate 25 are explained with greater particularity below.

A new photoactive material is described herein for the photoelectrolysis of water and solvated pollutants, based on a semiconductor core of silicon, the domain size of the silicon particle being so small as to exhibit quantum size effects. Quantum size effects are physical or electronic properties indicative of a discontinuous electronic band structure, the incomplete band structure still exhibiting discrete molecular orbital transitions. The silicon particle is produced at a pre-selected size, thus controlling the energy gap of the catalyst. An energy gap for the silicon nanoparticle greater than that of bulk silicon is a necessary element of the instant invention. For example, the energy gap for photolysis of water is preferred to be greater than 2.1 electron volts so as to operate under visible light illumination, corresponding to a silicon particle domain size of less than about 5 nanometers. The optimal energy gap of the silicon particle for photoelectrolysis of a solvated reactant is dictated by the electrochemical reaction potential of the specific reaction. Besides adjustment of the silicon domain size, electron transfer characteristics of the silicon semiconductor particle are optimally manipulated by altering the charge carrier densities through incorporating a dopant into the silicon particle, the particle is thus varied as to whether it is a net n-type or p-type semiconductor. The surface of the silicon particle is then optionally modified with catalysts tailored to the desired reaction. The catalysts are introduced as islands or isolated atoms decorating the silicon particle surface. Typical catalysts include noble metals, osmium, iridium, ruthenium and the oxides and chalcogenides thereof. For the purposes of this patent, noble metal is defined to include platinum, silver, gold, rhodium and indium. The remaining elements of the photoactive material for photoelectrolysis include adherence of the particles to a substrate and the formation of a protective silicon oxide on the silicon particle surface.

Silicon particles exhibiting quantum size effects and having a size distribution which varies by less than 20 percent of the mean particle diameter are produced by liquid phase photolysis of organosilane precursors under air sensitive conditions at or below, about one atmosphere. The details of this method for producing silicon particles of a selected size in the quantum size regime and optionally containing dopant ions is disclosed in application Ser. No. 08/840,301 filed Apr. 11, 1997, U.S. Pat. No. 5,850,064 by the inventor, which is incorporated herein by reference. The silicon particles produced by this method range in solubility and size from soluble, 2 nanometers in diameter, through to precipitated, bulk aggregate composed of domain sizes in excess of 50 nanometers. Dopants ions illustratively incorporated into the silicon particles of the co-filed invention include: lithium, beryllium, boron, nitrogen, sodium, magnesium, aluminum, phosphorus, titanium, vanadium, chromium, manganese, iron, cobalt, nickel, copper, zinc, gallium, arsenic, indium and antimony. The dopants are incorporated homogeneously throughout the volume of the silicon particle or distributed to form a dopant density gradient, depending on whether the dopant precursor is introduced at the beginning of the silicon particles growth phase growth phase or after the particle growth phase has already commenced.

The functional size of the silicon domain is dependent on the electrochemical potential of the desired reaction. The present invention involving the photolysis of water to hydrogen and oxygen using solar radiation is preferably carried out with a silicon active domain exhibiting sufficient quantum confinement to have an energy band gap of greater than 2.1 electron volts. For reasons, explained in greater detail below, a particle with a radius at least 2 nanometers greater than this size is initially produced.

The catalyst is present to facilitate a reaction on the particle surface. Optionally, the silicon particle 11 is modified by the addition of not one but, two separate catalyst materials: a reduction catalyst to facilitate the reduction half-cell reaction and an oxidation catalyst to facilitate the oxidation half-cell reaction. The identity of the specific catalyst materials is largely dependent on the nature of the reaction, the solution corrosivity and the energetics of the half-cell reactions. Conventional electrochemical catalysts are operative in the present invention and include noble metals; osmium; vanadium; iridium; ruthenium; the oxides and the chalcogenides thereof which have a band gap of less than about 3 electron volts; organometallics; and titanates of the formula $M_2TiO_{4+x}$, where M is cerium, chromium, iron, nickel, rhodium and tungsten, and x is 0 or 1, depending on whether M is +2 or +3 oxidation state, respectively. An island or layer of catalyst is deposited on the surface of the silicon particle under air- and water-sensitive conditions. The catalyst deposition onto the silicon particle surface while the particles are suspended in dry solvent solution occurs using conventional techniques illustratively including: redox chemistry from a metal precursor, in which the metal is in an electropositive oxidation state; photolysis or thermolysis as described in prior art U.S. Pat. No. 3,167,525, which is incorporated herein by reference; or agglomeration by mixing a suspension of pre-formed catalyst crystallites into the silicon particle suspension, followed by drying and sintering under an inert atmosphere. The catalyst deposition onto the silicon particle surface while the particles are dry occurs using conventional techniques illustratively including: evaporation, chemical vapor deposition, sputtering, or the like.

Prior to exposure of the silicon particle 11 and the adjacent catalyst 12 to a reaction environment it is necessary to protect the silicon particle against the reaction solution constituents. In a preferred embodiment, the silicon particle 11 is passivated toward reaction with an oxide coating. There are several advantages to passivating the silicon particle surface with oxygen. The oxides of silicon are generally impervious to reaction mixtures with the exception of highly acidic hydrogen fluoride-nitric acid solutions. The oxides of silicon are electrically insulating, thereby preventing undesired reactions from occurring away from the catalyst surface. In addition, the oxides of silicon are essentially optically transparent in the solar spectral range between 250 and 700 nanometers. This spectral range is of sufficient energy to drive many desirable photo-induced electrochemical reactions.

An oxide coating readily forms on a clean silicon particle surface, upon exposure to ambient air at standard room temperature. The oxide interpenetrates the silicon particle 11 to a depth of about 2 nanometers, which corresponds to from about 4 to 7 crystal lattice layers of silicon atoms. As a result of the diffusion of oxygen into the silicon particle 11, the active silicon domain 21 is smaller than the silicon particle 11, as synthesized, with a concomitant increase in the quantum size effect. Thus, in designing a photoactive device an initially larger size silicon particle 11 must be synthesized to account for the decrease in semiconducting domain size caused by oxidizing the surface. It is essential that the catalyst 12 and silicon particle 11 are tightly bound, else upon exposure to oxygen, the catalyst 12 is electrically isolated from the active silicon domain 21 by an intermediate oxide layer, thereby rendering the photoactive device inoperative.

Lattice spacing and thermal expansion differences associated with the bulk materials are less restrictive in the size regime of nanometer-sized particles, since the extreme surface curvature of a small particle increases the the surface energy and changes bulk bond lengths. The result is that silicon-catalyst combinations taught herein do not necessarily form stable interfaces as bulk phases.

It is appreciated that the silicon surface is passivated by: hydrogen; nitrogen; fluorine; some small cross-section, molecules or ions such as cyanides, where the molecules or ions have Pauling electronegativity values ($x_A-x_B$) of greater than about 1.0; and a variety of polymers. These alternative passivating agents are attractive alternatives to oxygen for the design of photoactive devices for certain specific reactions.

The suspended photoelectrochemical device at 20 constituting the reduced size silicon domain 21, the adherent catalyst island 12 and the passivating coating 13 of the silicon domain 21 is attached to an inert substrate 25. An advantage associated with adherence of the silicon domain 21 to a substrate is that suspension of a colloidal silicon particle in the reaction solution is generally thermodynamically disfavored. While the precipitation of a silicon particle from solution is kinetically slowed through coating the particle surface with a substance that imparts solubility, precipitation remains a generally energetically favored process. Furthermore, adhesion of the particles onto a substrate facilitates the usage of the photoactive device of the present invention with a fluid bed system, conventional to the art of reactor design.

The adherence of the unbound device 20 is accomplished by several conventional techniques including: mixing the particle solution with a support medium slurry; evaporating the particle solvent on a plate or powder of support medium; gravitationally settling the particles onto a plate or powder of support medium; adding a surfactant material to the particle solution that promotes adherence to a subsequently added support medium; or embedding the particles in a support matrix by means of a sol-gel process. Support media that are operative in the present invention illustratively include inert silicas, alumina, or titania. The oxide coating 13 and an oxide support medium generally adhere strongly to one another. Furthermore, diffusion of oxygen between the oxide coating and an oxide support film under device operating conditions does not deleteriously effect the performance of the bound device 30. The sequence of a.) affixing the silicon particle to a substrate and b.) the forming of a protective coating of the particle is reversible in those embodiments of the present invention where the catalyst is bonded to the silicon particle 11 prior to exposure to the passivating agent.

Figure 2:
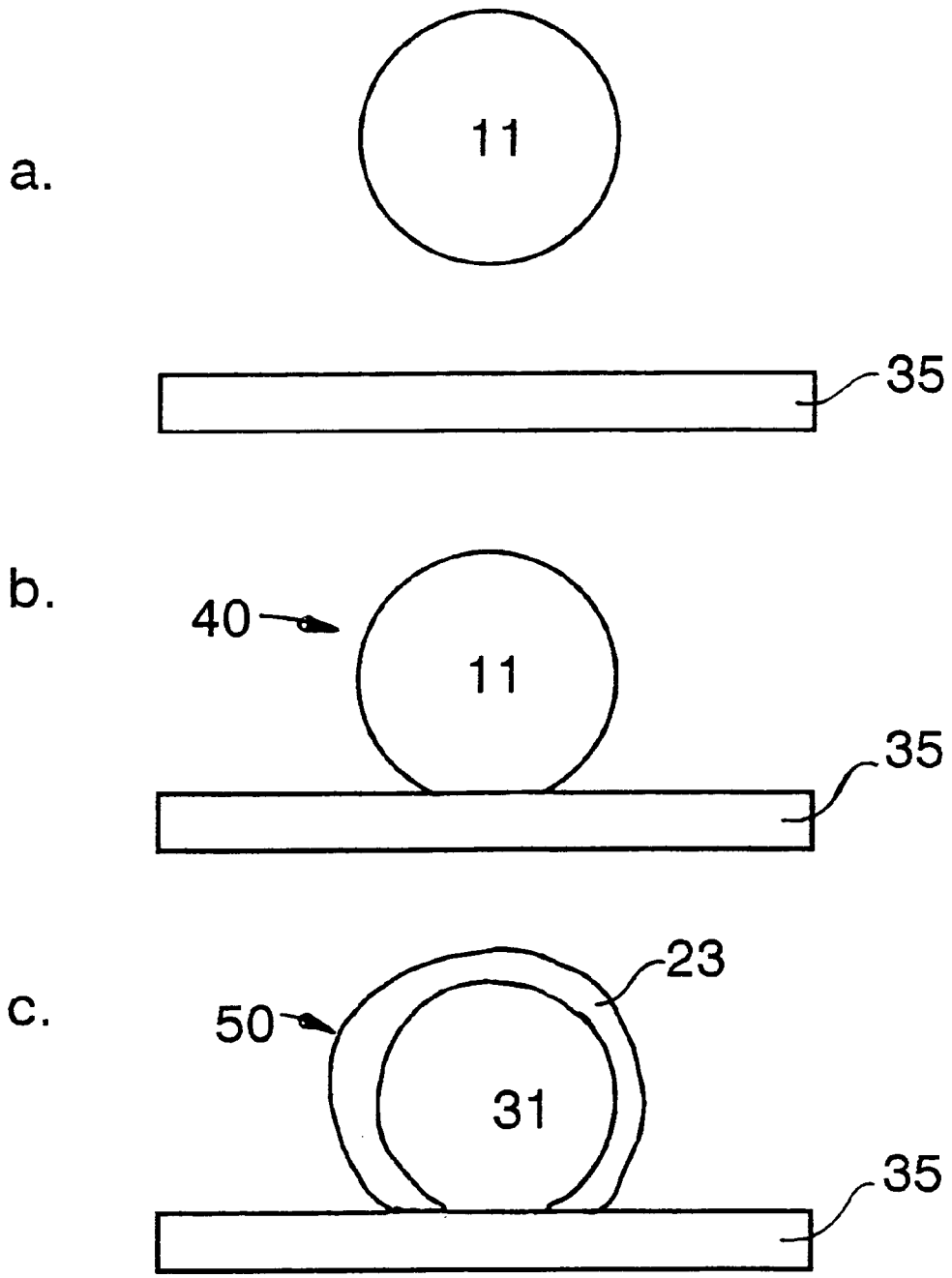
FIGS. 2(a)–(c) are a cross-sectional view of the sequence of steps in forming an embodiment of the present invention, wherein the semiconductor is contacted with a substrate catalyst.

FIG. 2 shows the present invention in which the support medium also serves as a catalyst. Active media which are operative as catalysts for the desired reaction of the photoelectrochemical device include: noble metals; osmium; ruthenium; iridium; the oxides and the chalcogenides thereof, having a band gap of less than about 3 electron volts. In utilizing an active support medium 35 an electrically conductive interface is required between the quantum confined silicon particle 11 and the support/catalyst 35 such that electrons or holes generated by excitation of the silicon particle 11 may enter the active support medium 35. Such an electrically conductive interface requires absorption. The catalyst deposition onto the silicon particle surface techniques discussed in reference to FIG. 1 similarly function in this embodiment. A silicon particle 11 is initially suspended in a solution, FIG. 2(a). The silicon particle 11 is then absorbed onto the support/catalyst 35 so as to form an electrically conductive interface, FIG. 2(b). The bound silicon particle 11 and support/catalyst 35 at 40 are passivated with a protective coating 23 to complete formation of the photoelectrochemical device 50 and creating a smaller silicon domain 31, relative to the silicon particle 11, as shown in FIG. 2(c).

A catalyst after being bonded to a quantum confined silicon semiconducting domain is optionally activated or derivatized, in order to increase the reactivity or selectivity. For example, platinum or osmium become effective oxidation catalysts by reacting the metals with sulfur containing compounds to form $PtS_2$ and $OsS_2$. Generally, metal catalysts which are effective reduction catalysts (reactant gains electron(s)) are converted to oxidation catalysts (reactant loses electron(s)) when reacted to form oxides or chalcogenides. The methods for reacting finely divided metals to the corresponding oxides and chalcogenides are well known to the art. The quantum confined silicon domain is generally unreactive to such treatments, owing to a passivating surface coating. However, the conditions necessary to create an oxide or chalcogenide of a given metal catalyst are possibly incompatible with maintaining a second catalyst in a reduced state. Calculation of the thermodynamic stability of the various components of a photochemical device is advised prior oxidizing an incorporated catalyst.

Activation of a catalyst incorporated into a photoelectrochemical device of the present invention is accomplished in a manner specific to the identity of each catalyst. Catalyst activation methods common to the art are operative herein and include: acid washing, plasma ionization, or the like. The removal of spurious deposits from the catalyst surface often increases the number of active reaction sites.

Optionally, a catalyst incorporated into a photoelectrochemical device is derivatized through the absorption of a variety of receptor molecules. The receptor molecules operative herein illustratively include: antibody variable chain regions; peptide sequences; enzymes; electrically conducting polymers; mono- and bi-layers of organic molecules, having a molecular weight of less than 1000; or the like. The receptor molecules function in the present invention to selectively bind reactants from a solution containing several potential reactants, while the attached photoelectrochemical device modifies the oxidation state of the reactant. For example, a gold electrode surface derivatized with a monolayer of thiols often has a modified product composition, as compared to the clean metallic surface.

Figure 3:
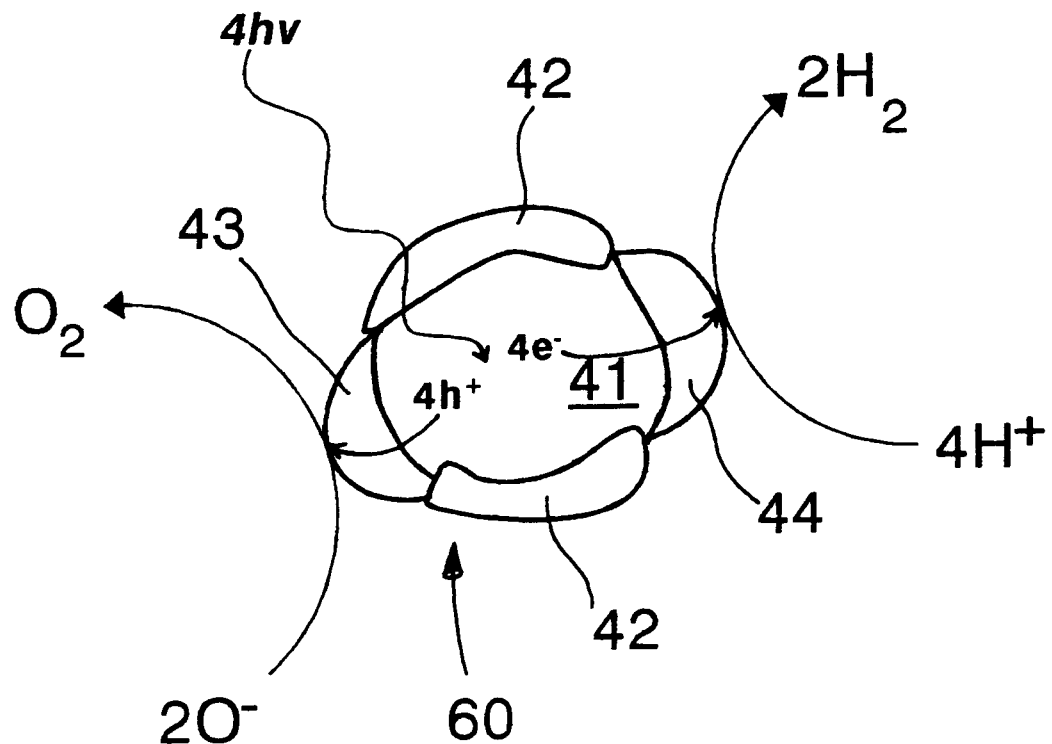
FIG. 3 is a cross-sectional schematic of a process by which water is decomposed to hydrogen and oxygen by the present invention.

In reference to FIG. 3, a photoelectrochemical device of the present invention is depicted which is capable of photolysing water into the constituent gaseous elements hydrogen, $H_2$ and oxygen, $O_2$. The device at 60 has a semiconducting silicon domain 41 of a size sufficiently small such that the band gap is at least 1.23 electon volts. Preferably, the band gap is greater than about 2.1 electron volts, but less than about 3 electron volts. The silicon domain 41 is optionally doped in the course of synthesis in order to increase charge carrier concentration. The silicon domain 41 has a passivating oxide coat 42. The oxide coat is sufficiently thick and continuous to prevent exposure of the silicon domain 41 to the surrounding aqueous solution 48. The silicon domain 41 is in electrical contact with the solution 48 via an oxidizing catalyst (hole acceptor) 43 and a reducing catalyst (electron acceptor) 44. Preferably, the oxidizing catalyst 43 is $RuS_2$; $PtS_2$; a chalcogenide of iridium; a chalcogenide of osmium; or $M_2TiO_{4+x}$, where M is cerium, chromium, iron, nickel, rhodium and tungsten, and x is 0 or 1, depending on whether M is +2 or +3 oxidation state, respectively. Preferably, the reducing catalyst 44 is a noble metal. The device functions by the absorption of incident photons with energy greater than the band gap of the silicon domain 41, designated as "hv" in FIG. 3. The resulting electron, "e–" and hole, "h+" tend to migrate to the solution interfaces of the reducing and oxidizing catalysts, respectively. Through an as yet unknown series of intermediates, the repetitive transfer of four like charged particles evolves the gaseous products from two equivalents of water. The net oxidation half cell reaction is

$$2O_2{-}+4h+\rightarrow O_2 \qquad (1).$$

The net reduction half cell reaction is

$$4H++4e-\rightarrow 2H_2 \qquad (2).$$

The device at 60 is preferably bound to an inert support medium (not shown). The pH of the water is optionally modified to maintain gas evolution. Acidifying the solution typically promotes the above reduction half-cell reaction (2), especially when lower excitation band gap silicon domains are employed.

The stoichiometrically generated hydrogen and oxygen gases of the present invention are readily collected and combusted as a non-pollution, high efficiency fuel stock.

The present invention is operative over a range of temperatures, largely limited by the solution freezing point on the low temperature end and the stability of the present invention photoactive device at the high temperature extreme. The present invention device is stable to greater than about 200° C. for even the smallest silicon domains. It is appreciated that the reaction rate is effected by the rate at which reactants diffuse to catalytic sites of the present invention. Thus, the higher reactant mobilities associated with elevated temperatures and gas phase solutions favor increased reaction rates. Temperature changes in addition to merely speeding reactions also modify the activity of reactant and solvent species, thereby effecting the reaction product mixture for some reactions. The behavior of an electrochemical reaction cell as function of temperature is known to the art.

While the specification is generally directed to the photocatalytic decomposition of water, it is appreciated that by using a quantum confined silicon domain having a band gap greater than or equal to the sum of the decomposition voltage for the desired photocatalytic reactions, the present invention functions to decompose organic molecules and inorganic salt ions. The catalysts selected to decorate the silicon domain have either electron or hole transport properties conducive to reaction, yet are stable to the solution environment under illumination. just as in water decomposition, it is preferred that the silicon domain be in electrical contact with both a reduction and oxidation catalyst. The organic molecules, or inorganic ions are optionally in aqueous solution, and thus, one of the half cell reactions is optionally designed to be a reaction of water.

The invention is further described in the following Examples. The description of particular embodiments is not intended to limit the invention to these specific embodiments, but rather to illustrate the breadth of alternatives, modifications and equivalents that may be included within the scope as defined in the appended claims.

EXAMPLE 1

A 100 milliliter dry hexane solution containing about 0.3 grams of 5 nanometer diameter silicon particles under an inert atmosphere of nitrogen, is mixed with a dry hexane suspension containing 1 nanometer platinum particles at 20° C. Since at least one platinum particle is desired to be absorbed onto each silicon particle, a 1:1.1 ratio of silicon-:platinum particles is created, corresponding to 0.025 grams of 1 nanometer platinum particles. The solution is stirred for about 8 hours in a borosilicate flask, and evaporated to a concentrated yellow solution. The concentrated yellow solution is then mixed with colloidal hexane solution of $RuS_2$, containing 0.5 grams of $RuS_2$ as 4 nanometer average colloidal diameter particles. The solution is stirred for 4 hours at 20° C. and evaporated to dryness on the top surface on an alumina tile. The tile is heated to 250° C. for 1 hour under an inert atmosphere of nitrogen. Air is then introduced and the tile cooled. The top surface of the alumina tile being yellow in color.

EXAMPLE 2

The procedure of Example 1, where the concentrated yellow solution is layered onto a sintered $RuS_2$ polycrystalline film. The solution is dried onto the top surface of the film. The coated film is then heated to 250° C. for 1 hour under an inert atmosphere of nitrogen. Air is then introduced and the tile cooled. The tile is immersed in deionized water to a depth of five centimeters. Upon exposure of the top surface of the tile the incident solar radiation, bubbles of hydrogen and oxygen form and continue to evolve under illumination.

EXAMPLE 3

The tile of example 1, is exposed to deionized water vapor mist, generated by an atomizer. Upon exposure of the top surface of the tile the incident solar radiation, hydrogen and oxygen gas form and continue to evolve under illumination.

EXAMPLE 4

A 100 milliliter dry hexane solution containing about 0.3 grams of 5 nanometer diameter silicon particles under an inert atmosphere of nitrogen, is evaporated onto a polycrystalline layer of $PtS_2$, the layer being supported on an alumina substrate. A dispersion of discontiguous silicon particles results on the $PtS_2$ layer. The substrate is then heated to 250° C. for one hour under an inert atmosphere of nitrogen, in order to sinter contact between the particles and the $PtS_2$ layer. The substrate is then cooled. A one milliliter droplet of an organinc solution containing 1 percent by weight of NAFION™ (DuPont product of polymeric perfluorosulfonic acid) onto the adherent particles and the substrate rotated at about 1000 rpm in order to spin coat NAFION™ onto the particles and the underlying $PtS_2$ layer. The spin coating procedure is repeated twice more in succession to yield the operative photoelectrochemical device.

EXAMPLE 5

The device of example 4 is immersed in deionized water to a depth of thirty centimeters. Upon exposure of the coated surface of the device to incident solar radiation, bubbles of hydrogen and oxygen form and continue to evolve under illumination.

EXAMPLE 6

The photoelectrochemical device of Example 1 is immersed in a $10^{-3}$ M methanolic solution of N-(2- nitrophenyl) amoniacetic acid, $(2\text{-}O_2N\text{—}C_6H_4)\text{—}NHCH_2COOH$. The solution is yellow in color. Under illumination the solution becomes colorless and gas evolution is observed. The illumination source is a 500 Watt xenon lamp with a 10 cm water filter and color filters, such that $\lambda > 400$ nm.

EXAMPLE 7

A 100 milliliter dry hexane solution containing about 0.3 grams of 5 nanometer diameter silicon particles under an inert atmosphere of nitrogen, is mixed with a dry hexane suspension containing 1 nanometer platinum particles at 20° C. Since at least one platinum particle is desired to be absorbed onto each silicon particle, a 1:1.1 ratio of silicon-:platinum particles is created, corresponding to 0.025 grams of 1 nanometer platinum particles. The solution is stirred for about 8 hours in a borosilicate flask, and evaporated to a concentrated yellow solution. The concentrated yellow solution is then mixed with colloidal hexane solution of $RuS_2$, containing 0.5 grams of $RuS_2$ as 4 nanometer average colloidal diameter particles. The solution is stirred for 4 hours at 20° C. and evaporated onto silica gel. The silica gel is then heated to 250° C. for one hour under an inert atmosphere of nitrogen to yield a photoelectrochemical device. The silica gel containing the silicon particles is then packed into a quartz tube having an internal diameter of 5 millimeters. Metanolic solution containing $5 \times 10^{-4}$ M thiophosgene, $CSCl_2$ is passed through the quartz tube. No reaction is detected in the dark, however, under illumination as per example 6, the solution changes from red to colorless and gas evolution is observed.

EXAMPLE 8

The device of example 7 is packed into a quartz tube and a stream of 20 percent by weight methanol in water, buffered to pH 7.8 is passed therethrough. Under xenon lamp illumination as per example 6, carbon dioxide and hydrogen gas evolution is detected.

EXAMPLE 9

The device of example 2 is immersed in a $10^{-3}$ M aqueous solution of sodium sulfite to a depth of five centimeters. Upon exposure of the top surface of the tile to xenon lamp illumination as per example 6, hydrogen evolution is observed in addition to the conversion of sulfite to sulfate and dithionate ions.

What is claimed is:

1. A photoelectrochemical device for driving an electrochemical reaction comprising:
    a silicon domain having a quantum confined excitation energy band gap greater than that of bulk silicon and a size between 1 and 20 nanometers, wherein the excitation energy band gap is sufficient to induce reaction in the reactant; and
    a first catalytic material in electrical contact with said silicon domain.

2. The photelectrochemical device of claim 1 further comprising: a substrate onto which said domain is affixed.

3. The photoelectrochemical device of claim 2 wherein said substrate is either an electrical insulator or a catalytic material.

4. The photoelectrochemical device of claim 3 further comprising: a second catalytic material in contact with said silicon domain.

5. The photoelectrochemical device of claim 4 wherein said first or said second catalytic material is predominantly an electron acceptor and the other of said first or said second catalytic material is predominantly a hole acceptor.

6. The photoelectrochemical device of claim 5 wherein said first or said second catalytic material is selected from a group consisting of: noble metals; osmium; iridium; ruthenium; the oxides and the chalcogenides thereof which have a band gap of less than 3 electron volts; organometallics; or titanates of the formula $M_2TiO_{4+x}$, where M is cerium, chromium, iron, nickel, rhodium and tungsten, and x is 0 or 1, depending on whether M is +2 or +3 oxidation state, respectively.

7. The photoelectrochemical device of claim 3 further comprising a passivating coat on said domain so as to prevent contact between said domain and said reactant.

8. The photoelectrochemical device of claim 7 wherein said passivating coat is selected from a group consisting of: hydrogen; nitrogen; fluorine; small cross-section molecules or ions, where the molecules or ions have Pauling electronegativity values $(x_{A-xB})$ of greater than about 1.0; or polymers.

9. The photoelectrochemical device of claim 3 wherein the silicon domain is less than 10 nanometers in diameter.

10. The photoelectrochemical device of claim 3 wherein the silicon domain is less than 6 nanometers in diameter.

11. The photoelectrochemical device of claim 3 wherein said silicon domain is doped to increase the charge carrier density.

* * * * *